United States Patent

[11] 3,541,965

[72] Inventor  John H. McElroy
              14 E. Roosevelt Circle, Red Bank, New
              Jersey 07701
[21] Appl. No. 821,929
[22] Filed     May 5, 1969
               Continuation-in-part of Ser. No. 715,414,
               March 22, 1968, pending.
[45] Patented  Nov. 24, 1970

[54] THREE-WAY CONVEYOR TRACK SWITCH
     4 Claims, 8 Drawing Figs.
[52] U.S. Cl. .................................................... 104/130
[51] Int. Cl. ..................................................... E01b 7/00,
                                                                B61b 13/00
[50] Field of Search .......................................... 104/89,
              103, 130, 131, 100, 88; 246/314, 322, 347

[56] References Cited
     UNITED STATES PATENTS
     993,695    5/1911   Leith ............................ 246/322
     2,564,953  8/1951   Bopp ............................ 104/103
     3,063,384  11/1962  Sackett ......................... 104/130
     3,193,675  7/1965   Parkes et al. .................. 104/130

Primary Examiner—Arthur L. La Point
Assistant Examiner—Richard A. Bertsch
Attorney—B. P. Fishburne, Jr.

ABSTRACT: A semiautomatic switching apparatus for monorail trolley conveyors having the capability of receiving trollies moving on three angularly spaced paths or tracks. The apparatus utilizes a simplified spring-loaded toggle linkage for releasably holding a flexible track segment in two angularly adjusted positions, together with switching levers having parts in the paths of movement of the trollies on all tracks of the switching apparatus.

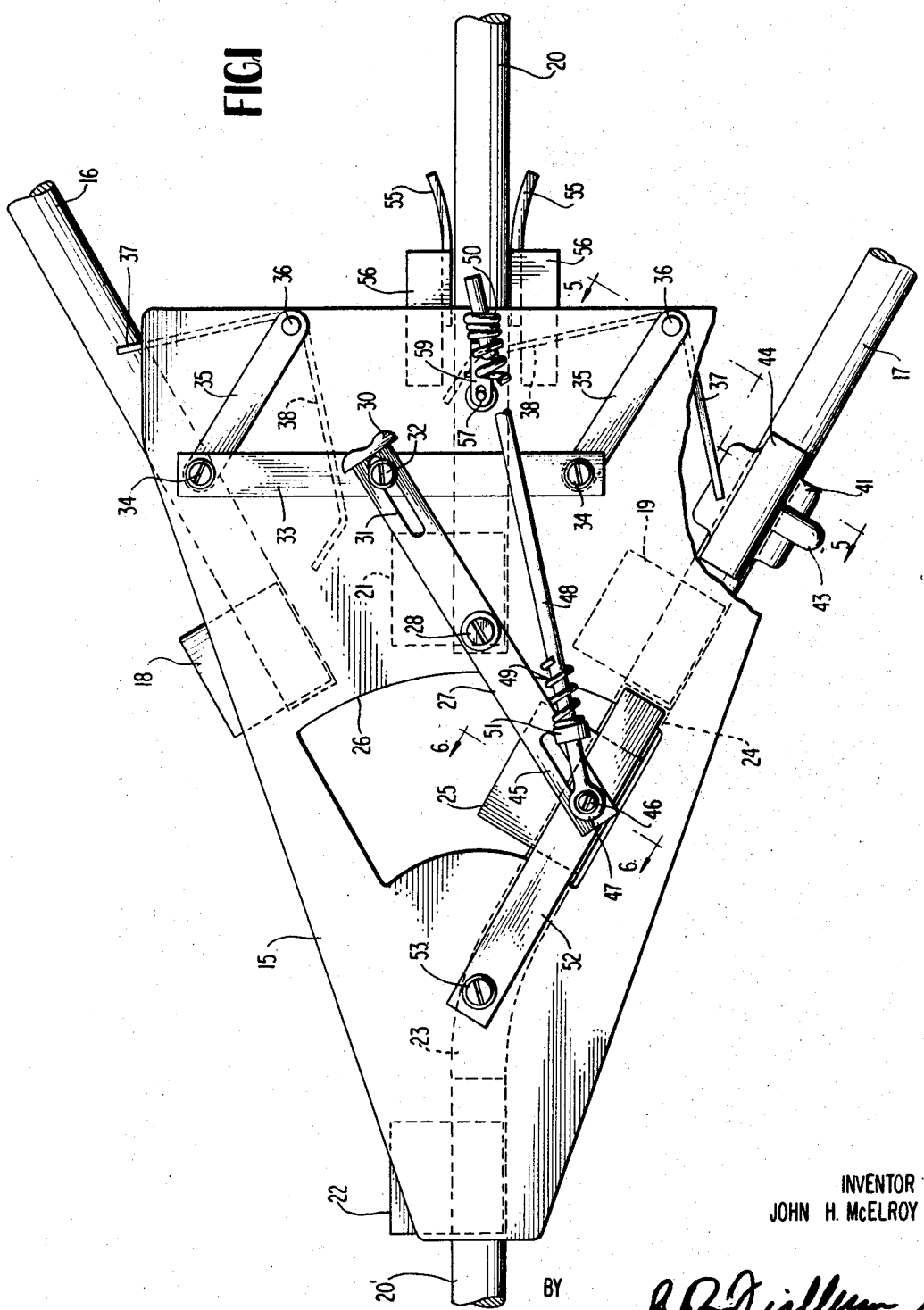

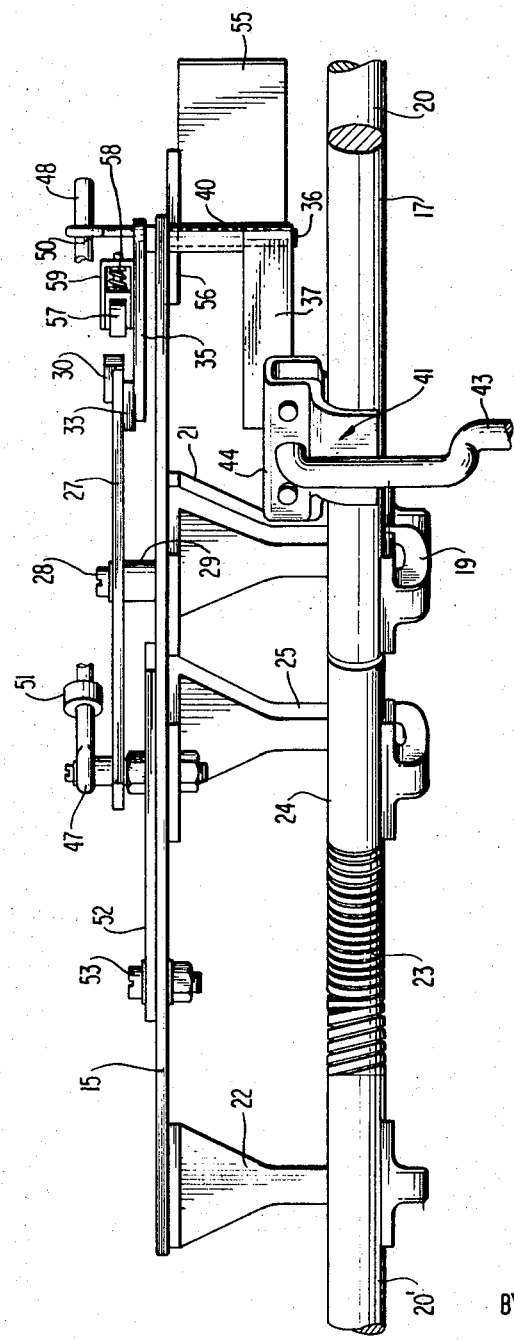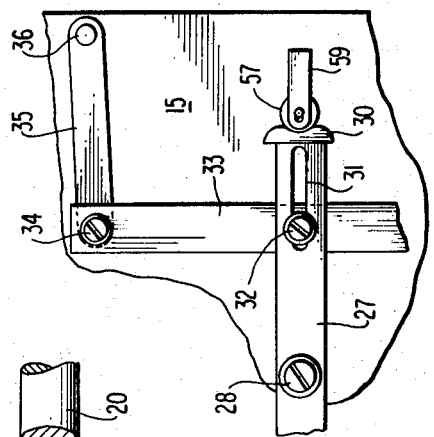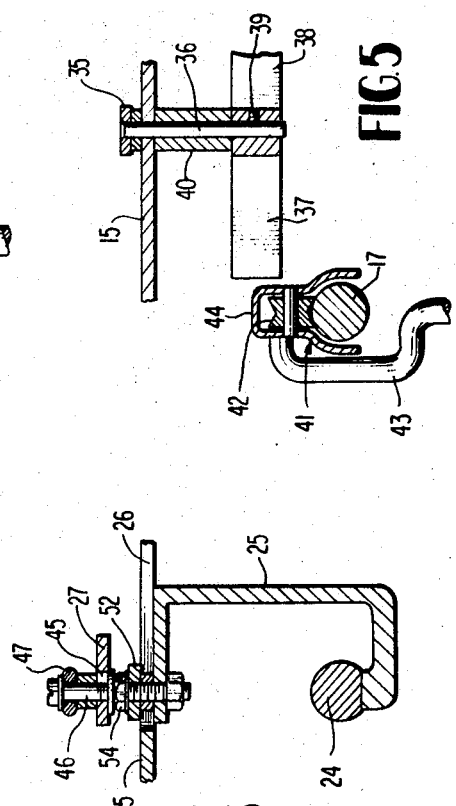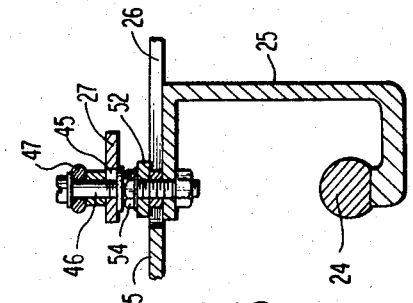

INVENTOR
JOHN H. McELROY

BY
ATTORNEY

THREE-WAY CONVEYOR TRACK SWITCH

This application is a continuation-in-part of prior copending U.S. Pat. application Ser. No. 715,414, for CONVEYOR TRACK SWITCH, filed Mar. 22, 1968.

The apparatus disclosed in said prior application embodies two-way track switches for monorail trolley conveyors and also a right angular or crossover apparatus for such conveyor systems. However, the structures in the prior application do not answer the need for a three-way track switch which is a necessity in monorail trolley conveyor systems employed in garment warehouses and other like installations.

The invention therefore is an improvement on and a carrying forward of the invention and structure in said prior application while preserving the basic simplicity, ruggedness and reliability of the two-way switch structure in the earlier application. The various features and advantages of the invention will be made clear during the course of the following detailed description.

DESCRIPTION OF DRAWING FIGURES

FIG. 1 is a plan view of a three-way conveyor track switch embodying the present invention.

FIG. 2 is a side elevation of the switch apparatus.

FIG. 5 is an enlarged fragmentary vertical section on line 5–5 of FIG. 1.

FIG. 6 is a similar section on line 6–6 of FIG. 1.

FIG. 7 is a fragmentary plan view showing elements of the switching linkage releasably locked on dead center.

DESCRIPTION OF PREFERRED EMBODIMENT

Figure 3:
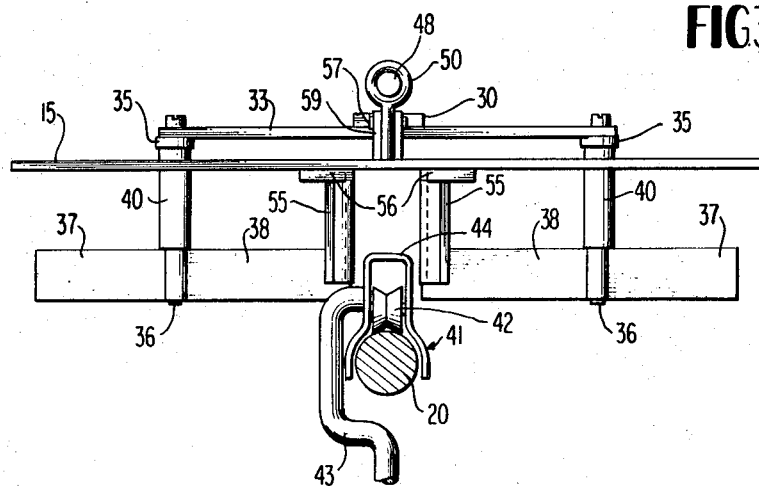
FIG. 3 is an end elevation thereof showing a trolley moving on a center track.

Referring to the drawings in detail, wherein like numerals designate like parts, the numeral 15 designates a flat mounting plate of roughly triangular form and adapted to be supported at the desired elevation by any conventional overhead supporting means as shown in said prior application. The mounting plate 15 is horizontal in use and all other parts of the invention switch structure are connected therewith or mounted thereon, as will be described.

At a convenient elevation substantially below the mounting plate 15, first and second angularly disposed converging rigid tracks 16 and 17 are disposed as shown with their terminal ends beneath the mounting plate fixedly supported on hanger brackets 18 and 19, whose top webs are fixedly secured to the mounting plate 15 by any suitable means. A third or center track 20 is provided at the same elevation as the converging tracks 16 and 17 and substantially midway therebetween, and this center track has its terminal end fixedly supported beneath the mounting plate 15 by similar third hanger bracket 21 with the mounting plate.

A downstream extension 20' of the center track is shown also supported on the mounting plate by a fixed hanger bracket 22 and all of the described tracks lie in a common horizontal plane below the mounting plate, as shown in FIG. 2. The downstream center track extension 20' has a resilient flexible section 23 similar to a coil spring terminating in a short rigid track section or head 24 secured to and seated on a hanger bracket 25 which is movable in an arcuate path, FIG. 1, the mounting plate 15 having an arcuate slot 26 to accommodate such movement. By means to be described, the downstream flexible track section having the head 24 is selectively shiftable into close axial alinement with the terminal ends of any of the three rigid tracks 16, 17 and 20 and such shifting is initiated by the engagement of a moving trolley on one upstream track with a linkage element of a shifter mechanism, now to be described.

The switch apparatus further comprises a toggle link 27 pivoted at 28 near its longitudinal center to the mounting plate 15 and spaced in a plane above the mounting plate by a suitable spacer 29. The toggle link 27 carries a cam detent head 30 at one end thereof for use in releasably locking the link and associated elements on dead center, in a manner to be described. Near the detent head 30, link 27 has a first slot 31 receiving a pivot element 32 slidably, said pivot element being secured to the midpoint of a transverse shifter link 33 immediately below the toggle link 27 and having its opposite ends pivotally connected at 34 to center crank arms 35 secured rigidly to the tops of vertical pivot shafts 36 which are journaled upon the mounting plate 15. The lower ends of the rotatable pivot shafts 36 have fixedly secured thereto switching levers 36 having approximately right angular arms 37 and 38, these levers being secured to the shafts 36 by set screws 39 or the like, FIG. 5. Spacers 40 are intervened between the switching levers and the bottom of mounting plate 15. As shown in FIG. 2, the switching levers are well below the mounting plate and slightly above the tracks 16, 17 and 20 so as to be in the path of movement of trolleys 41 moving on the tracks, said trolleys each having a track-engaging wheel 42, FIG. 3, a suitable pendant 43 and a reduced width head portion 44, which is the element actually striking the lever arms 37 or 38, depending upon the situation. It will be understood that turning of any lever arm 37 or 38 through contact with a moving trolley below the mounting plate will cause turning of the associated pivot shaft 36 and the crank arm 35 attached to the top thereof. This, in turn, shifts the link 33 laterally and turns the toggle link 27 on its pivot 28, one way or the other.

Near its opposite end, the pivoted toggle link 27 has a second slot 45 receiving therethrough movably a pivot bolt 46, FIG. 6. The bolt 46 extends above and below the link 27, and above this link engages through a circular eye 47 on one end of a toggle spring rod 48 having a compressible toggle spring 49 mounted thereon, as shown. The far end of the rod 48 engages slidably through a fixed guide loop or eye 50 suitably attached to the mounting plate 15 and spaced thereabove. One end of the toggle spring 49 bears against the eye 50 while its opposite end bears against a collar 51 on the rod 48 and preferably adjustably mounted thereon so that the tension of the toggle spring may be varied.

Below the toggle link 27 and adjacent the top face of the mounting plate 15 is a third toggle arm or link 52 receiving the bolt 46 therethrough pivotally and having its remote end pivoted by an element 53 to the mounting plate 15. A nut 54 and flat washer, FIG. 6, are disposed between the links 27 and 52 for proper spacing of the parts without binding. The pivot bolt 46 extends downwardly through the mounting plate slot 26 and is secured rigidly to the previously-described hanger bracket 25 which carries the head 24 of the flexible track section 23. It should now be apparent that back and forth pivoting of the link 52 on its pivot 53 under influence of the toggle mechanism and the shifting means composed of link 33, links 35 and lever arms 37 and 38, the bracket 25 traverses the mounting plate laterally in an arcuate path generally defined by the slot 26 in FIG. 1. In this manner, the head 24 of the flexible track section is able to assume three stable positions in axial alignment with any of the three tracks 16, 17 and 20, one such stable position being illustrated in FIG. 1 in connection with the track 17 having the trolley 41 shown thereon, after having engaged the adjacent switching lever arm 37.

The switch apparatus further embodies a pair of divergent curved trolley head guiding and stablilizing shoes 55 having bracket parts 56 secured fixedly to the underside of mounting plate 15. As shown in FIGS. 2 and 3, the shoes 55 are immediately above the center track 20 and are spaced apart an adequate distance to receive therebetween the head 44 of a trolley moving on the center track into the switching apparatus.

Figure 4:
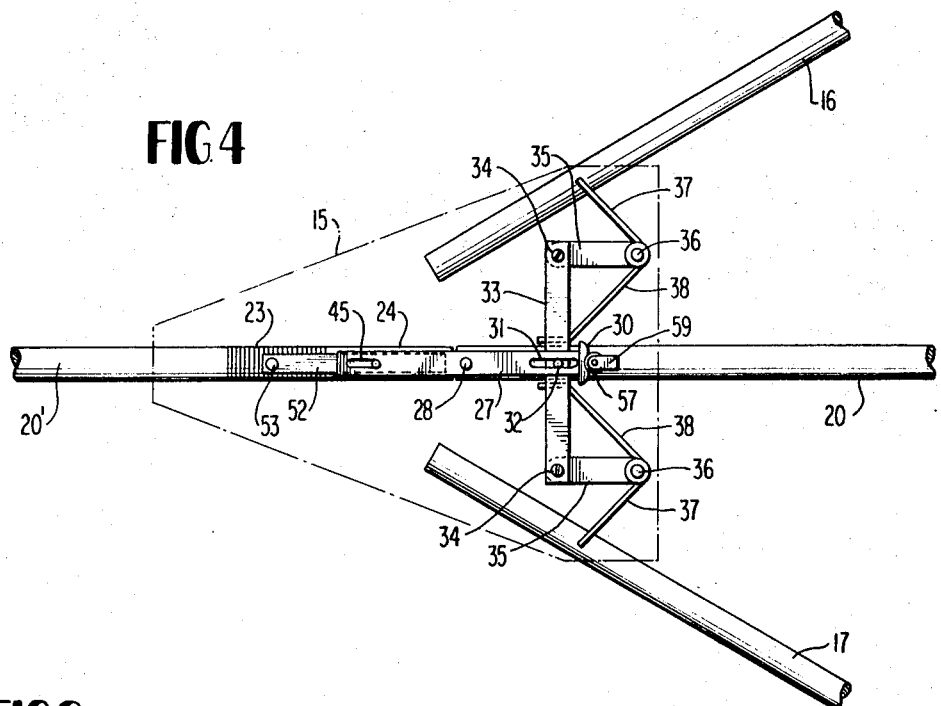
FIG. 4 is a partly diagrammatic plan view of the apparatus in a dead center position with the mounting plate and elements of the toggle mechanism omitted for clarity.

A small detent roller 57 backed up by a spring 58, FIG. 2, in a slide bracket 59 cooperates with the detent cam or head 30 in the manner best shown in FIG. 4 to releasably lock the toggle switching mechanism at a dead center position when the straight through center track 20 is being used and the flexible track section is alined therewith, as shown. At this time, the pivots 53, 28 and 32 are all on the axis of the center track 20 and a dead center condition of the toggle mechanism and switching linkage exists, as shown.

Figure 8:
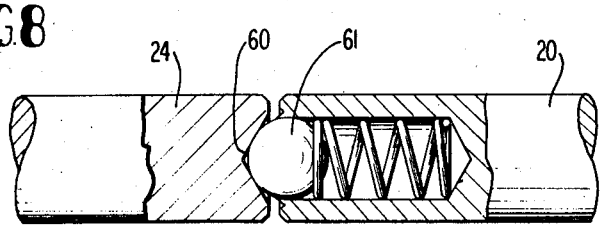
FIG. 8 is an enlarged fragmentary vertical section showing a modified form of dead center detent for the switching linkage.

FIG. 8 shows a modification of the yielding detent or locking means between the flexible track section and the rigid center track. As shown in FIG. 8, in lieu of the detent means 30—57 in FIG. 4, the flexible track head 24 may have a recessed seat 60 formed in its leading end adapted to receive a spring-pressed ball detent 61 carried directly at the downstream end of the center track 20. The remainder of the linkage would remain exactly as shown and described and the only difference is that the dead center locking arrangement is achieved directly through the center track 20 and the head of the flexible track, rather than through the toggle link 27 with its detent head 30 and cooperating roller 57 above the main mounting plate. Various additional dead center detent means or releasable locking means are feasible and may be utilized in some instances instead of the two arrangements depicted in the drawings.

OPERATION

In light of the foregoing description, it is believed that the operation of the three-way switch apparatus is substantially apparent. However, to summarize the operation, it will be assumed that the mechanism is releasably locked in the center track or dead center position shown in FIG. 4 whereby any number of trolleys 41 may pass directly through the switch apparatus from the rigid track 20, across the flexible track section 23 and on to the downstream center track 20'. Under these conditions, as shown in FIG. 4, the switching lever arms 38 are clear of the trolley heads 44 passing through the center track and the switch mechanism is stable in the center or dead center position.

Assume further that a trolley 41 on track 17 moves into the switch, FIG. 4, its head 44 will strike the switching lever arm 37 which is now across the track 17 and this arm will be moved to the position shown in FIG. 1. Such movement will shift the adjacent crank 35 and shifter link 33 to the position of FIG. 1 which is the second stable position of the switch apparatus. It will be noted in FIG. 1 that one switching lever arm 37, although in a different position from FIG. 4, is still across the track 16 and one lever arm 38, while in a different position from FIG. 4, is now across the center track 20. The movement of the link 33 has turned the toggle link 27 from its dead center position and the detent means 57—30 has yielded to this movement and become disengaged. The toggle spring 49 acting through the rod 48 has exerted its force on toggle links 27 and 52 and this latter link has turned together with the pivot bolt 46 and the hanger bracket 25 and the head 24 of the flexible track to the second stable position of the switch apparatus where the flexible track section is alined with the track 17.

Returning to the dead center condition shown in FIG. 4, it will be understood that had the trolley 41 struck the lever arm 37 adjacent the track 16 instead of the one adjacent the track 17, the switching apparatus would have responded in exactly the manner shown and described above in connection with FIG. 1 except that the head 24 of the flexible track section would have been shifted by the toggle linkage into alinement with the track 16 and this is the third stable position of the tristable or three-way switch. Considering FIGS. 1 and 4, it will be noted that for any use position of the three-way switch, there is always one switching lever arm 38 or 37 in a trolley-engaging position with respect to the other two tracks or paths not then in use and the switch is always ready to receive a trolley on one of the other tracks and to shift automatically to one of the other two remaining stable use positions. For example, in FIG. 1, if the lever arm 38 across the center track 20 is struck by a trolley the mechanism will return to the dead center condition shown in FIG. 4. If the lever arm 37 across the track 16 in FIG. 1 is struck, the mechanism will switch automatically to the stable position where the head 24 is alined with the track 16. A three-way switch is thus provided which is simple and foolproof, entirely reliable in operation, rugged and durable, and relatively inexpensive to make. The advantages of the invention should now be apparent without the necessity for further description.

I claim:

1. A three-way switch apparatus for trolley conveyor systems comprising a mounting member, three angularly spaced fixed tracks connected with the mounting member and including a center track and side converging tracks, a downstream track having a connection with the mounting member and including a flexible section adapted to be shifted into alinement with terminal ends of any of said three fixed tracks, a spring-loaded toggle linkage operable to shift said flexible section selectively to any of three stable positions where the flexible section is alined with one of said fixed tracks, said toggle linkage comprising a first link pivoted between its ends to the mounting member, a second link pivoted to the mounting member and having a shifting pivotal connection with the first link, said shifting pivotal connection being attached to said flexible track section, a rod connected to said shiftable pivotal connection and having a sliding connection with the mounting member, a compressible toggle spring on said rod, a shifter linkage on the mounting member including lever parts extending into crossing relationship with the fixed tracks so that trolleys moving thereon will strike the lever parts and the latter will move said shifter linkage and toggle linkage from one stable position to another stable position, and means forming a shifting pivotal connection between said first link and a part of said shifter linkage.

2. A three-way switch apparatus for trolley conveyor systems comprising a mounting member, three angularly spaced fixed tracks connected with the mounting member and including a center track and side converging tracks, a downstream track having a connection with the mounting member and including a flexible section adapted to be shifted into alinement with terminal ends of any of said three fixed tracks, a spring-loaded toggle linkage connected with said flexible section and having a connection with the mounting member and operable to shift said flexible section selectively to any of three stable positions where the flexible section is alined with one of said fixed tracks, and a shifter linkage on the mounting member adapted to operate the toggle linkage and comprising a laterally movable link having a pivotal sliding connection with a part of the toggle linkage between its ends, crank arms pivotally connected with end portions of the laterally movable link, shafts secured to the crank arms and pivotally connected to the mounting member, and lever arms on said shafts, each lever arm consisting of a pair of arms arranged generally perpendicular, whereby one lever arm of each pair may project into crossing relationship with the center fixed track and the other lever arm may project into crossing relationship with one of said side tracks, engagement of a trolley with any of said lever arms activating said shifter linkage and through the shifter linkage moving the spring-loaded toggle linkage from one stable position to a second stable position.

3. A tristable three-way switching mechanism for a trolley conveyor track system wherein the mechanism may be operated solely by contact with a moving trolley and without manual control, said switching mechanism comprising a stationary mounting and supporting member, three angularly spaced fixed convergent tracks connected with said member, a downstream track having a fixed connection with said member and including a flexible section adapted to be formed into a curve and a terminal end shiftable into alinement with the ends of any of said three fixed tracks, a spring-loaded toggle linkage connected with said downstream track and also having a connection with said member and being operable to shift the downstream track to any of three stable positions relative to said three fixed tracks, a resilient dead center releasable locking means for securing said toggle linkage on dead center with the downstream track aligned with the center fixed track of said three tracks, a shifter link having a pivotal sliding connection with said toggle linkage, crank elements pivoted to said shifter link and said member, and lever arms carried by the crank elements and projecting into the paths of movement of trolleys on said three fixed tracks, whereby the shifter link is caused to move said toggle linkage and said downstream track from one stable position to another stable position.

4. The structure as defined in claim 3, and each lever arm consisting of a right angular arm structure having one portion capable of projecting into the path of a trolley on the center fixed track and another portion capable of projecting into the path of a trolley on one of the other two fixed tracks.